US010042445B1

(12) United States Patent
Boelter

(10) Patent No.: US 10,042,445 B1
(45) Date of Patent: Aug. 7, 2018

(54) ADAPTIVE DISPLAY OF USER INTERFACE ELEMENTS BASED ON PROXIMITY SENSING

(71) Applicant: Amazon Technologies, Inc., Seattle, WA (US)

(72) Inventor: Joshua Joel Boelter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 14/495,045

(22) Filed: Sep. 24, 2014

(51) Int. Cl.
*G06F 3/041* (2006.01)
*G06F 3/0488* (2013.01)
*G06F 3/0481* (2013.01)
*G06F 3/0354* (2013.01)

(52) U.S. Cl.
CPC .......... *G06F 3/041* (2013.01); *G06F 3/03545* (2013.01); *G06F 3/04817* (2013.01); *G06F 3/04886* (2013.01); *G06F 2203/04101* (2013.01); *G06F 2203/04108* (2013.01)

(58) Field of Classification Search
CPC .. G06F 3/03545; G06F 3/0416; G06F 3/0426; G06F 3/048; G06F 3/04812; G06F 3/0481; G06F 3/04817; G06F 3/0482; G06F 3/0483; G06F 3/04842; G06F 3/0488; G06F 3/04886; G06F 2203/04101; G06F 2203/04108; G06F 2203/04805; G06F 2203/04806; B60K 2350/1012
See application file for complete search history.

(56) References Cited

U.S. PATENT DOCUMENTS

| | | | | |
|---|---|---|---|---|
| 2006/0209040 A1* | 9/2006 | Garside | ............... | G06F 3/03545 345/173 |
| 2009/0289914 A1* | 11/2009 | Cho | ........................ | G06F 3/044 345/173 |
| 2009/0315848 A1* | 12/2009 | Ku | ........................ | G06F 3/0416 345/173 |
| 2009/0327977 A1* | 12/2009 | Bachfischer | ........... | B60K 35/00 715/863 |
| 2010/0090964 A1* | 4/2010 | Soo | ........................ | G06F 3/0416 345/173 |
| 2010/0174591 A1* | 7/2010 | DeAngelo | ............. | G06F 3/0482 705/14.4 |
| 2011/0018811 A1* | 1/2011 | Miernik | ................ | G06F 3/0416 345/173 |
| 2011/0083089 A1* | 4/2011 | Pahud | ................... | G06F 3/0425 715/765 |
| 2011/0221776 A1* | 9/2011 | Shimotani | ............ | G06F 3/0421 345/647 |

(Continued)

*Primary Examiner* — Keith Crawley
(74) *Attorney, Agent, or Firm* — Kilpatrick Townsend & Stockton LLP

(57) ABSTRACT

Described herein are techniques for adaptively displaying graphic elements (e.g., user interface elements) on a display of a device based on sensing proximity of an input device (e.g., a hand or fingertip of a user, a stylus, etc.) to the display of the device. For example, in response to an input device being detected to be less than a threshold distance from the display of the device, one or more graphic elements are presented or dynamically resized on the display. However, in response to no input device being detected to be less than the threshold distance from the display, the one or more graphic elements are not presented or are maintained in their current size on the display.

18 Claims, 13 Drawing Sheets

(56) References Cited

U.S. PATENT DOCUMENTS

| | | | |
|---|---|---|---|
| 2012/0120002 A1 | 5/2012 | Ota | |
| 2013/0152015 A1* | 6/2013 | Costenaro | G06F 3/0482 |
| | | | 715/808 |
| 2015/0007076 A1* | 1/2015 | Lee | G06F 3/0488 |
| | | | 715/769 |
| 2015/0100537 A1* | 4/2015 | Grieves | G06N 5/048 |
| | | | 706/52 |
| 2015/0220253 A1* | 8/2015 | Landau | G06F 15/0291 |
| | | | 715/204 |
| 2016/0004348 A1* | 1/2016 | Roziere | G06F 3/041 |
| | | | 345/174 |

* cited by examiner

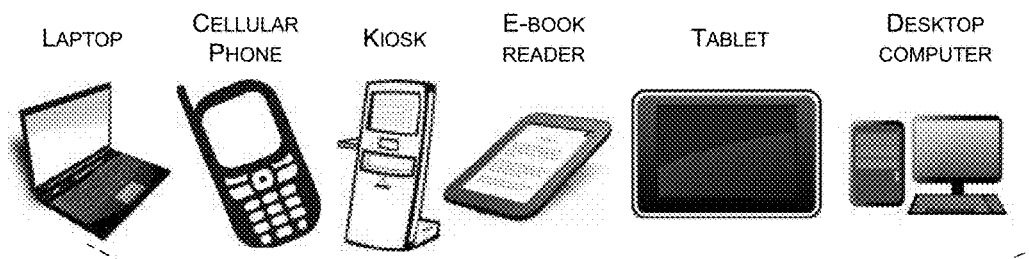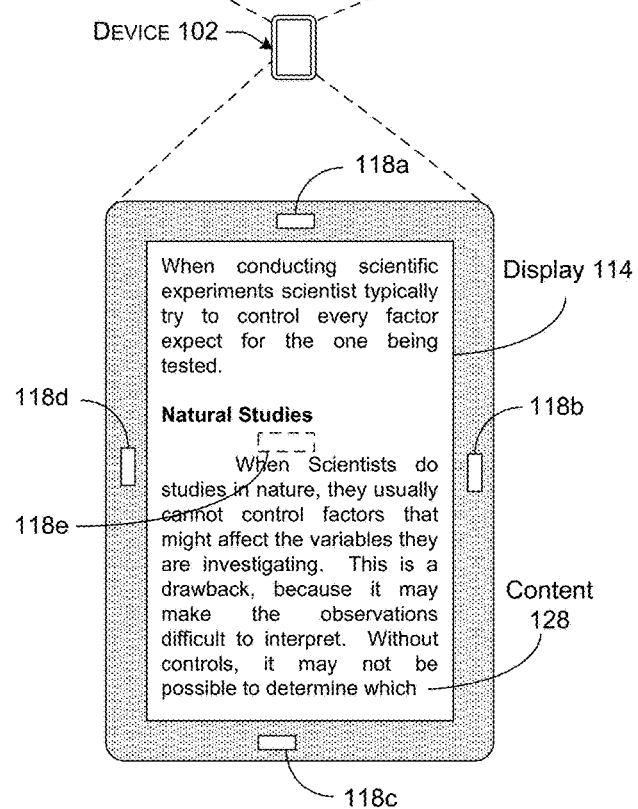
FIG. 1B

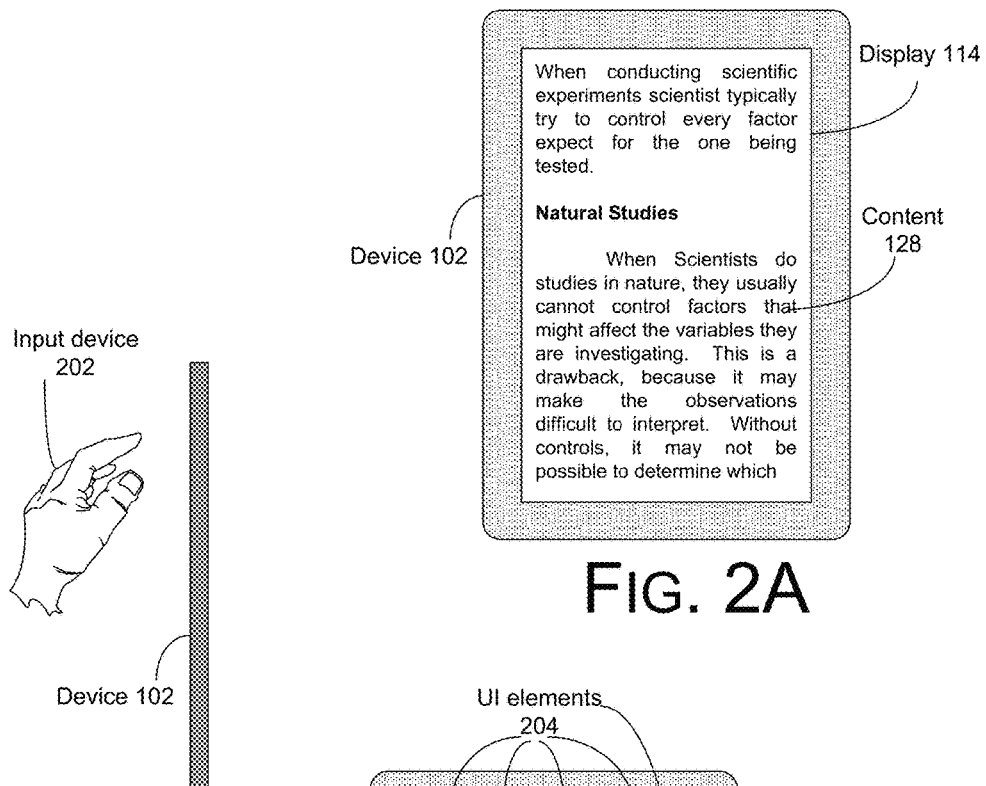
FIG. 2A
FIG. 2B
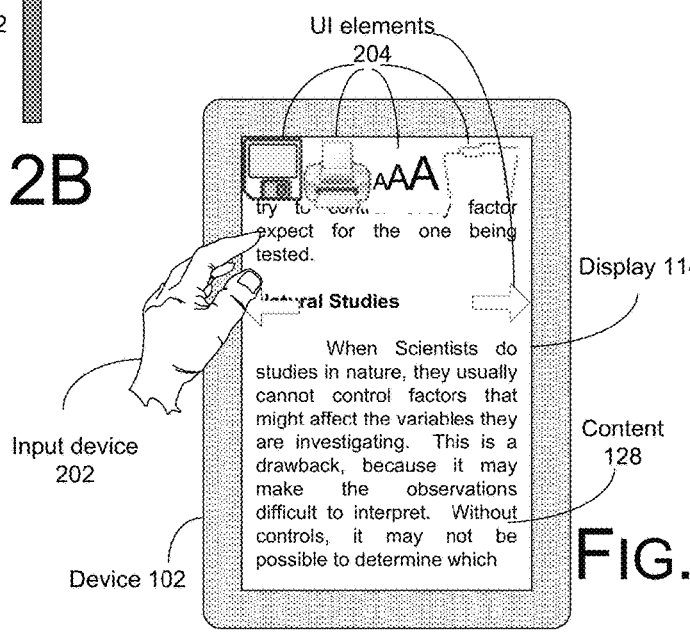
FIG. 2C

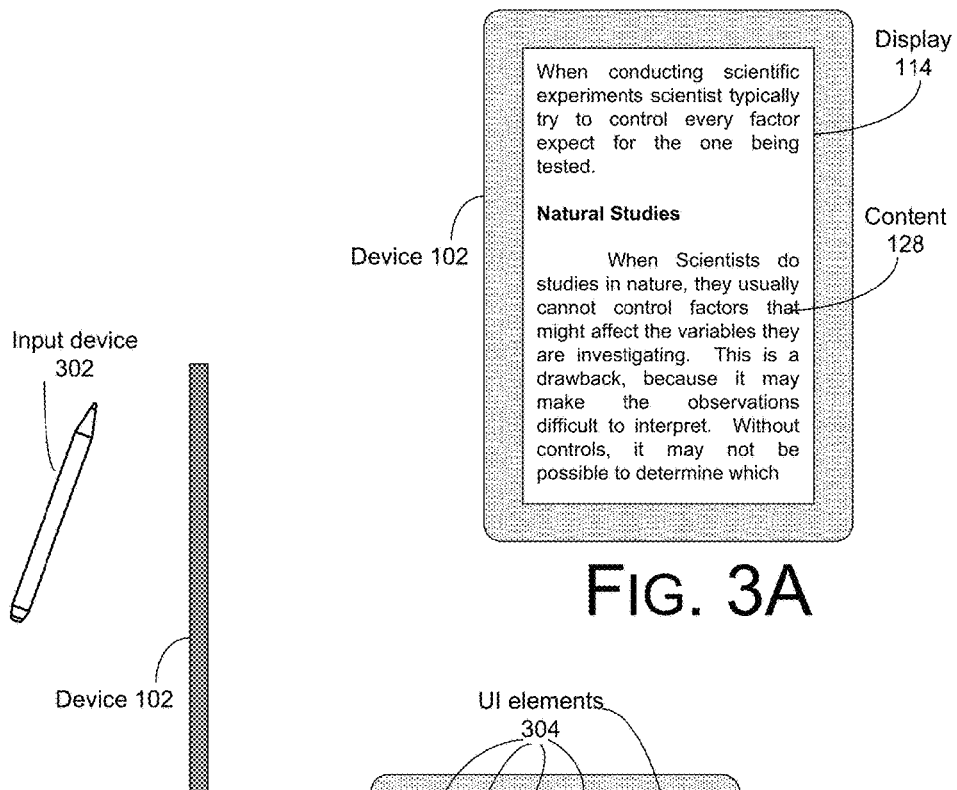
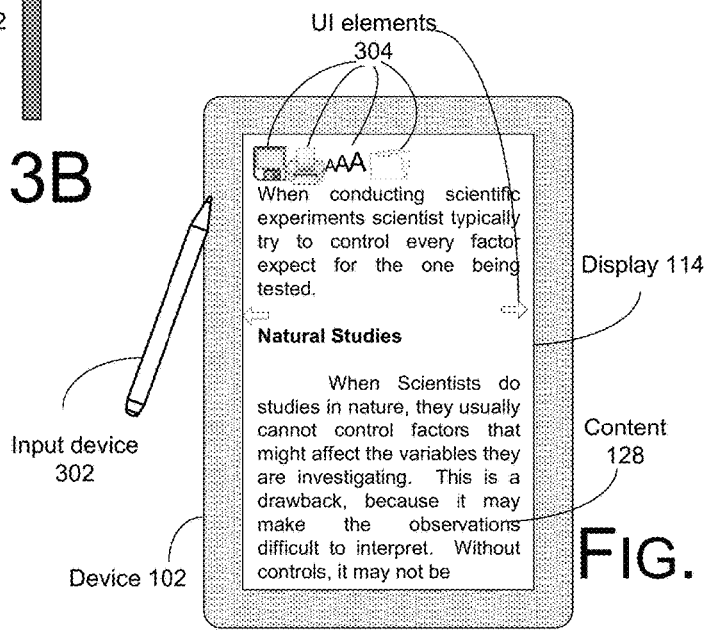

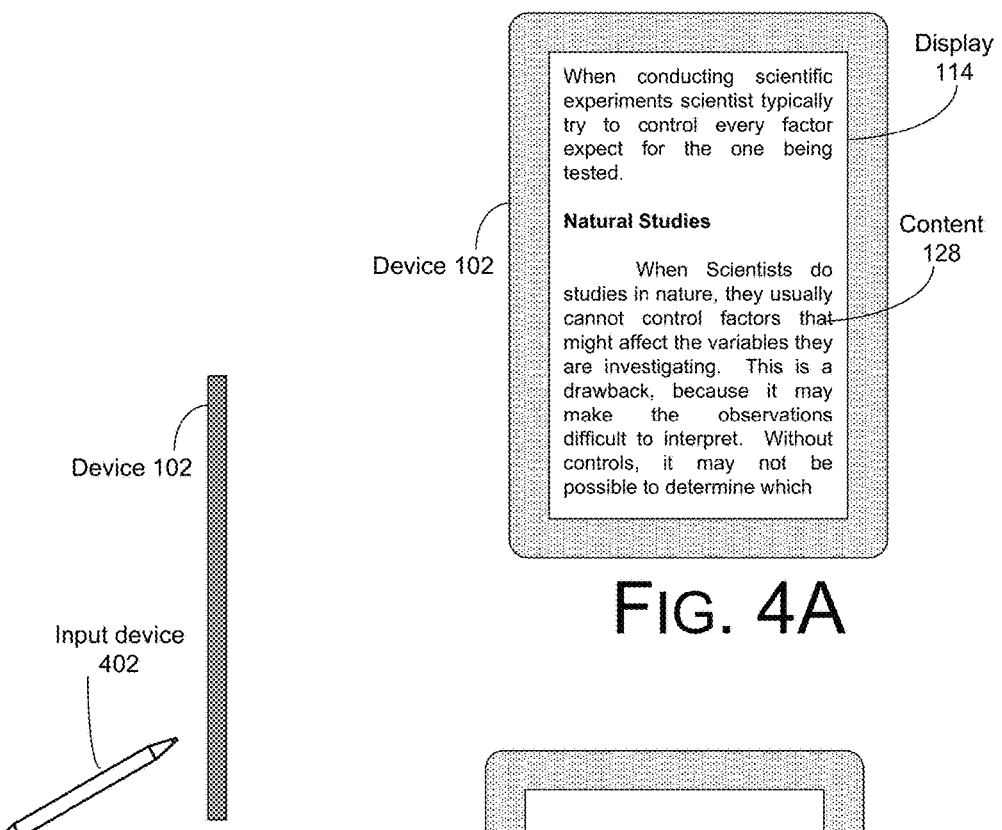
FIG. 4A
FIG. 4B
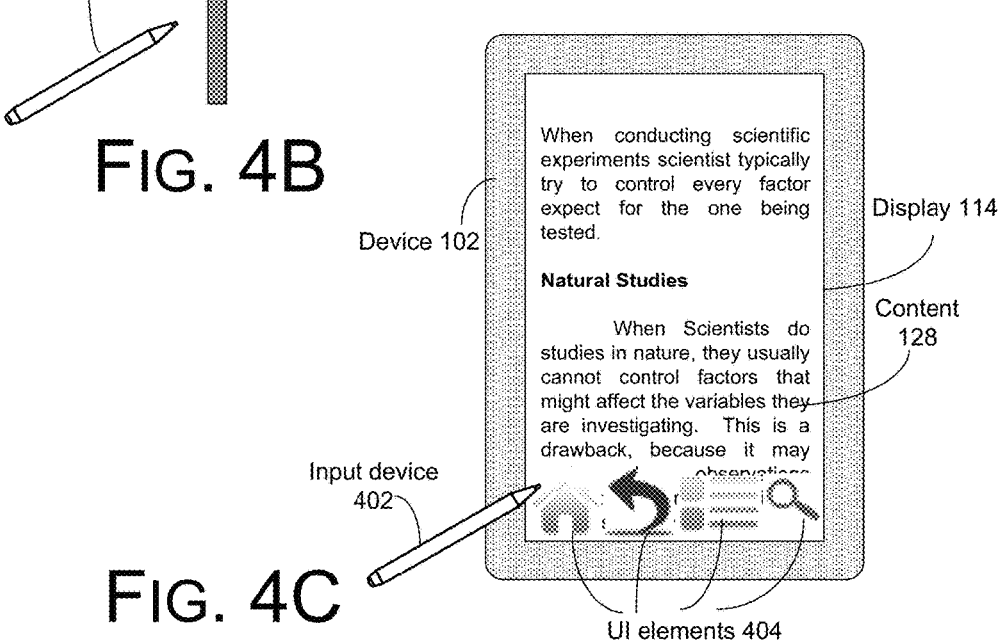
FIG. 4C

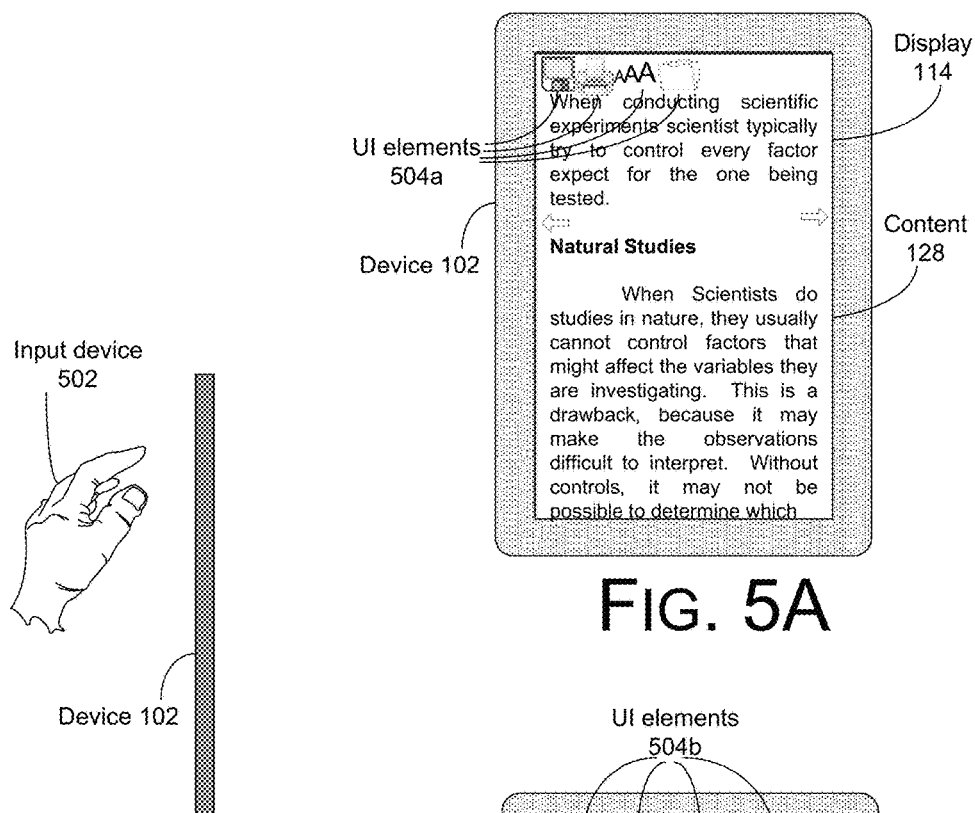
FIG. 5A
FIG. 5B
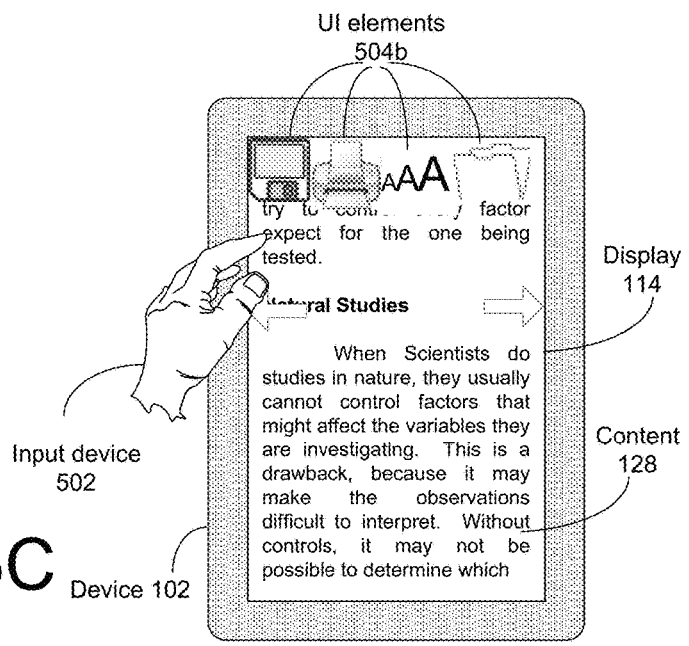
FIG. 5C

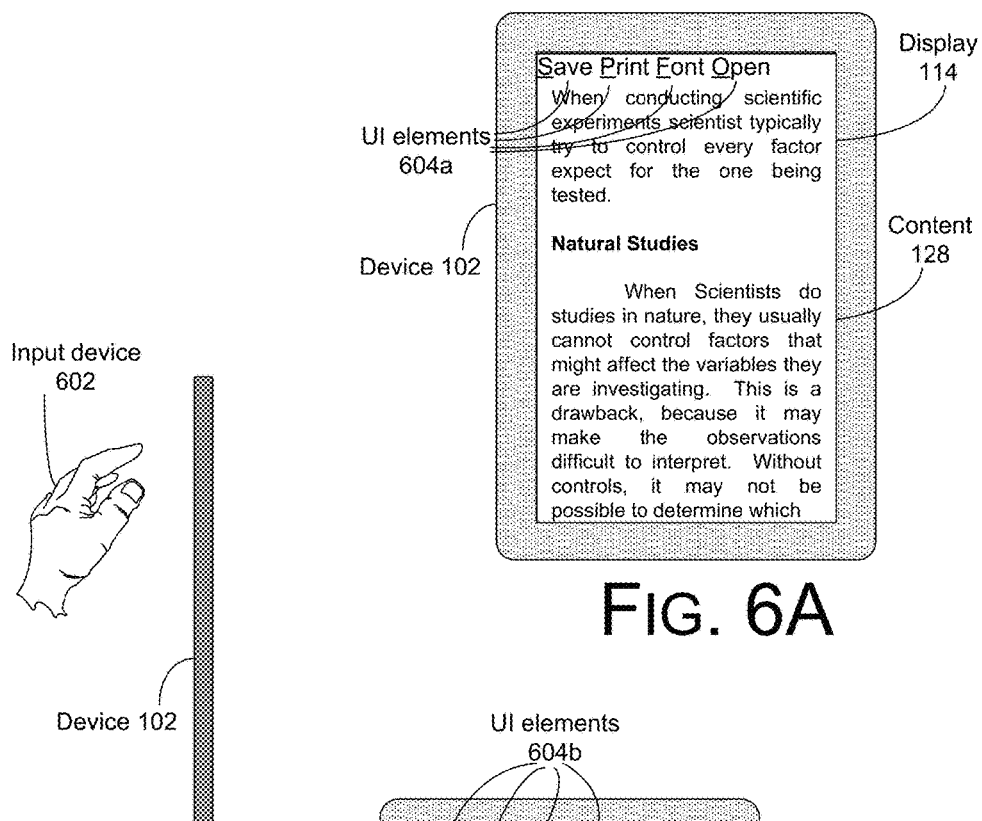
FIG. 6A
FIG. 6B
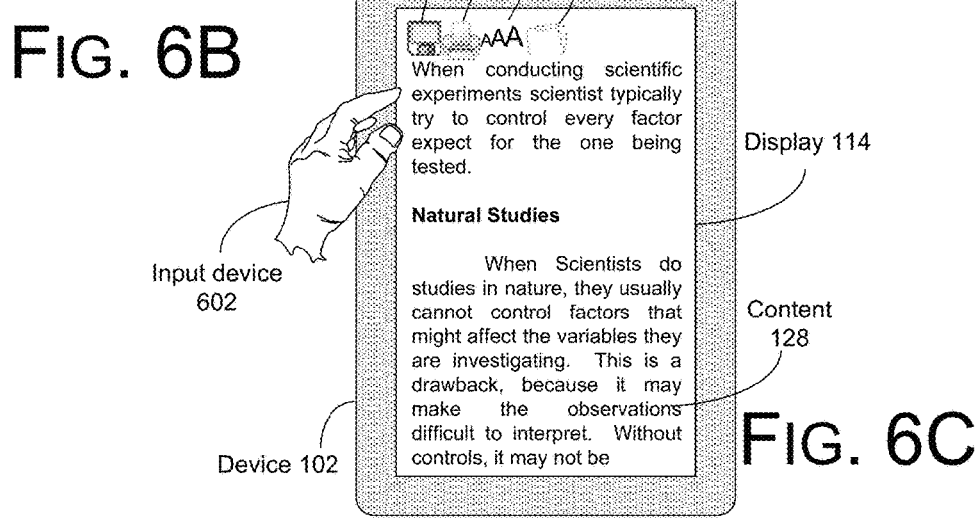
FIG. 6C

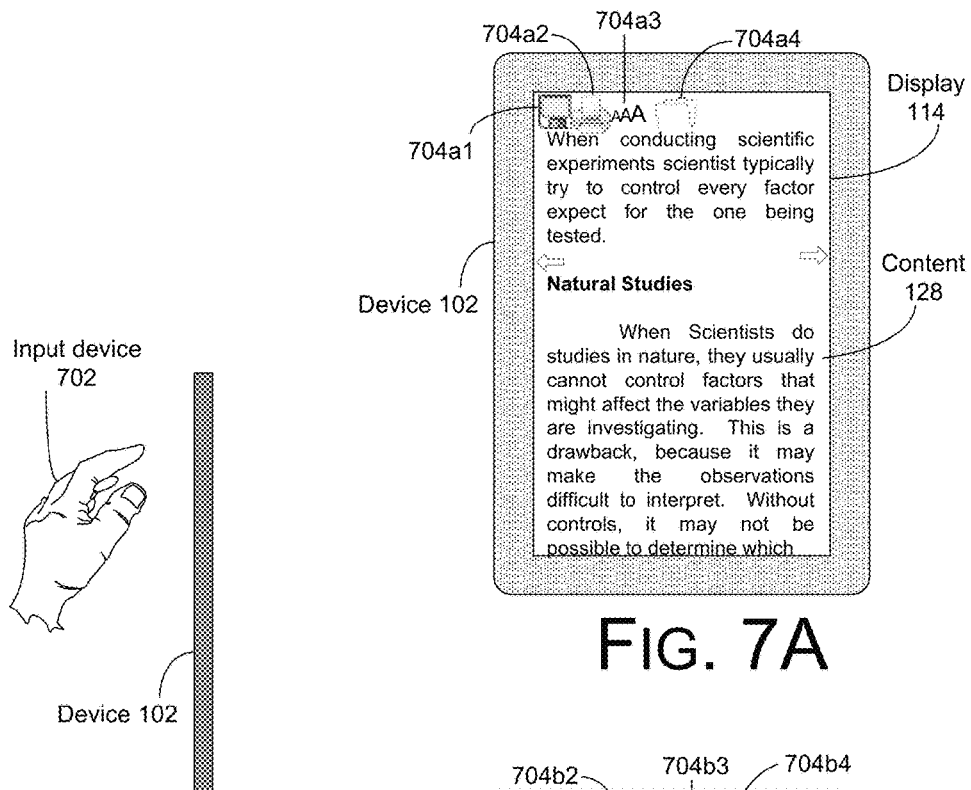
FIG. 7A
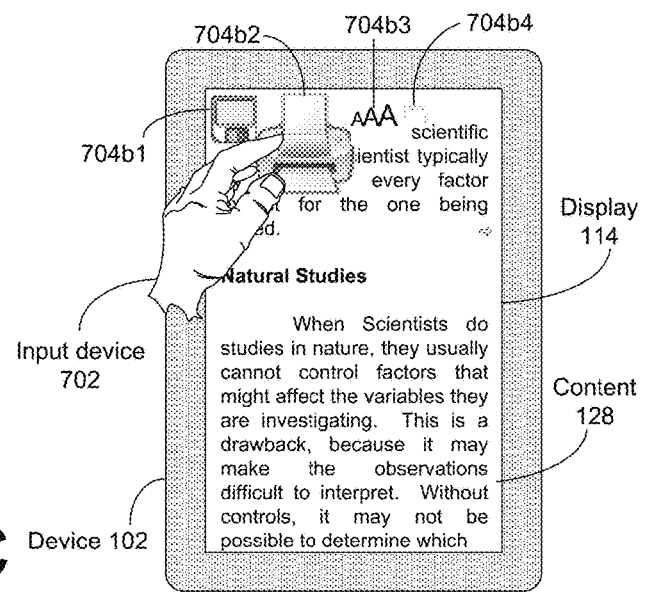
FIG. 7B
FIG. 7C

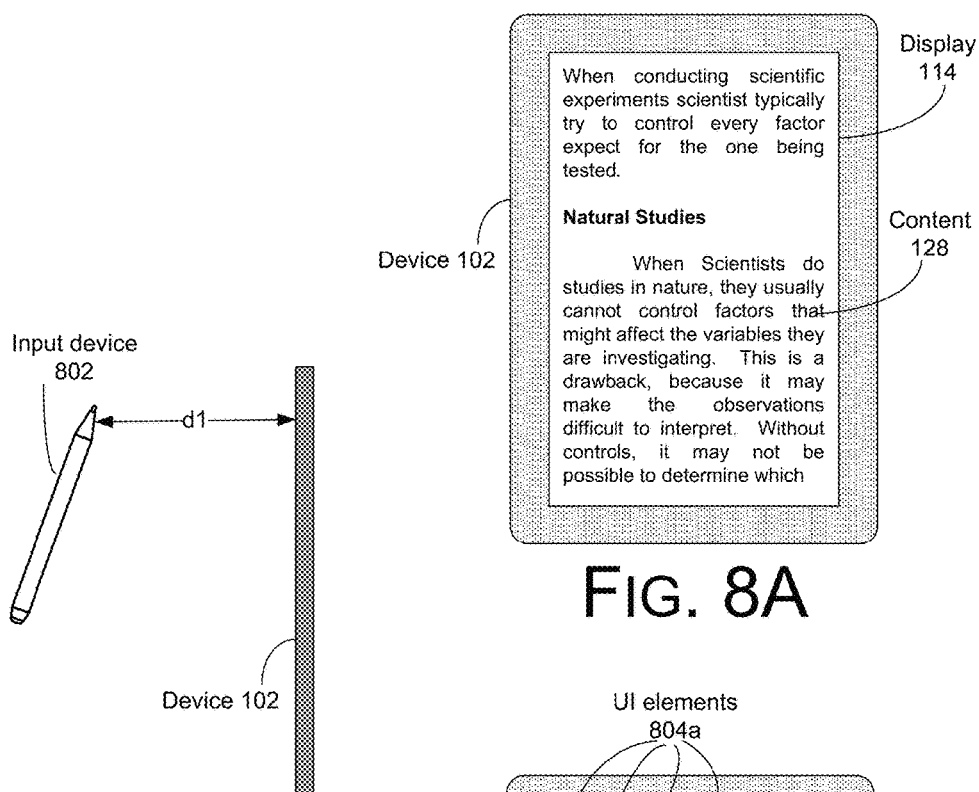
FIG. 8A
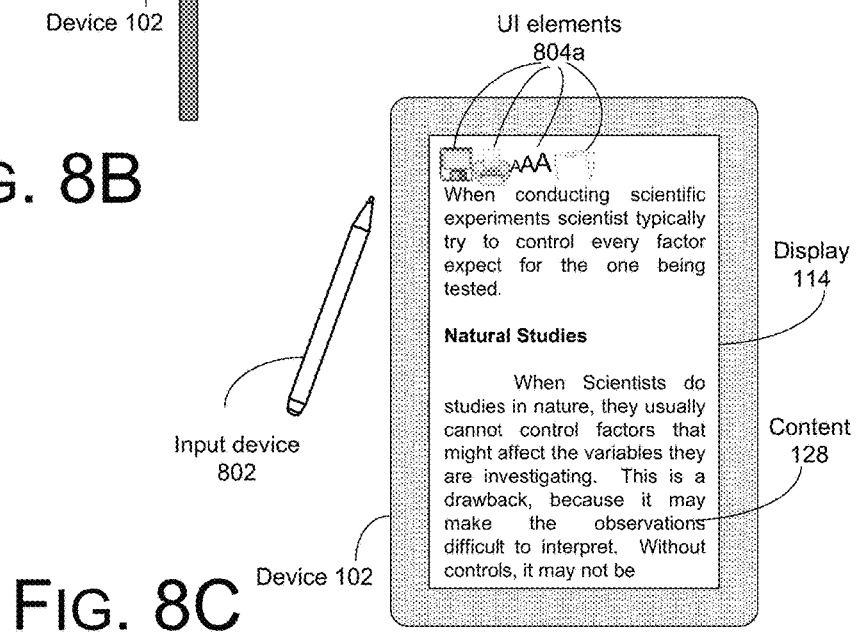
FIG. 8B
FIG. 8C

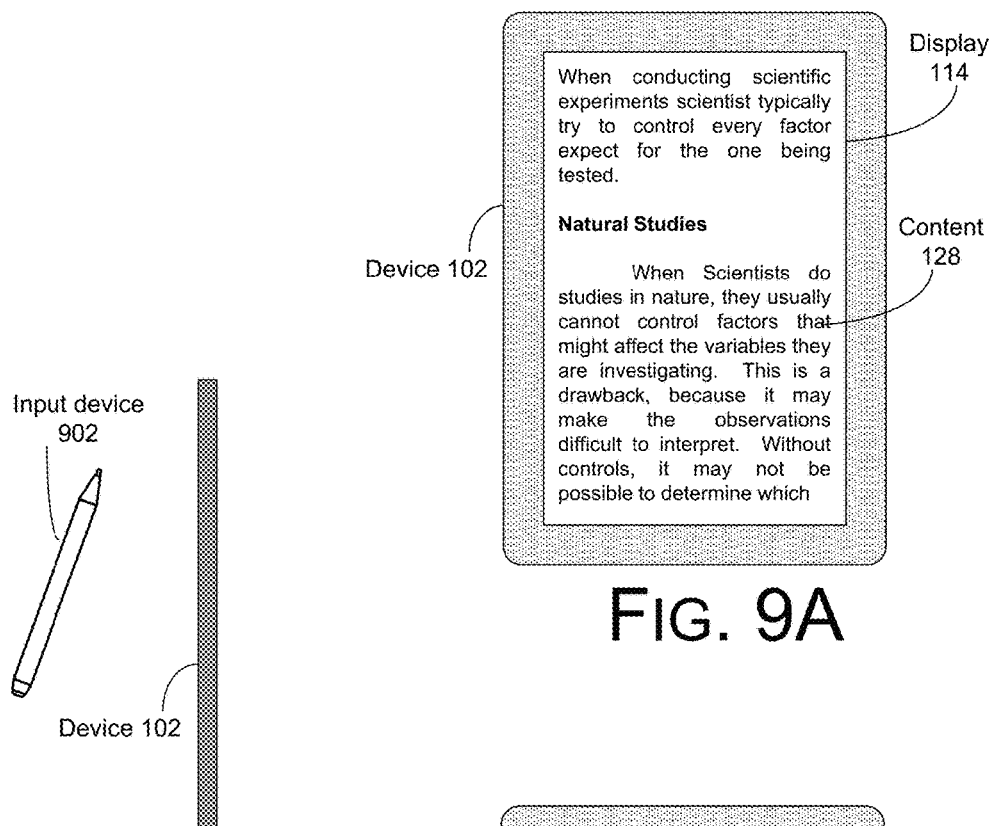
FIG. 9A
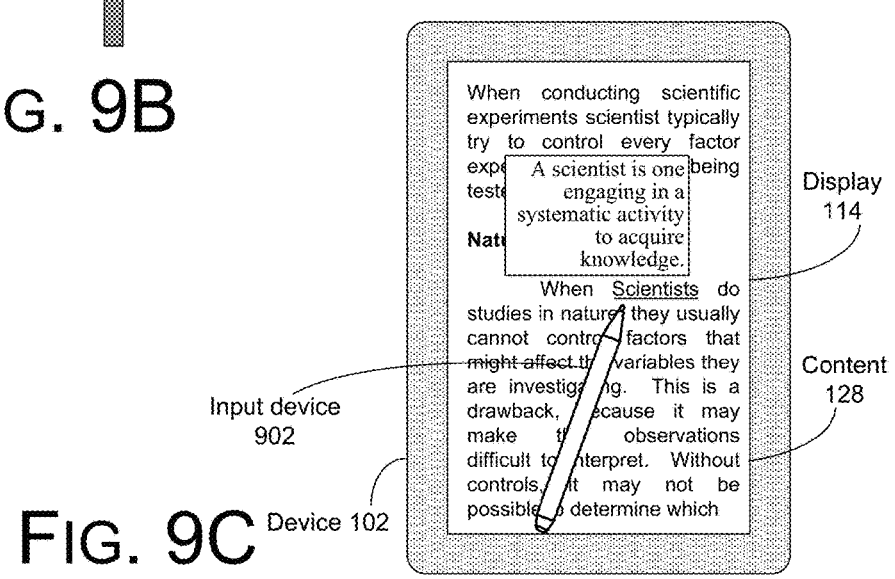
FIG. 9B
FIG. 9C

ADAPTIVE DISPLAY OF USER INTERFACE ELEMENTS BASED ON PROXIMITY SENSING

BACKGROUND

Touch screen displays are becoming increasingly popular these days. Touch screen displays may be found in a plethora of consumer electronic devices, to view digital content.

A user may interact with the touch screen display by, for example, touching the display with one or more fingers, a stylus, or any other appropriate input device. For example, the user may touch, using a finger, an icon on the touch screen, to initiate an action associated with the icon. Touch interfaces are commonplace for consumer devices, such as phones and tablet computing devices. However, in some situations, touch interfaces pose a problem. For instance, in industrial settings, workers who are wearing gloves may have difficulty selecting an icon on the screen. Because of a relatively large size of a fingertip of the user's hand (gloved or even ungloved in some situations), it may be desirable that a size of the icon be made relatively large, e.g., to enable the user to accurately touch the desired icon (and to avoid inadvertently touching an adjacent icon). However, such large icons may take up useful space of the display, thereby reducing space for displaying other content on the display. Accordingly, there remains a need to improve touch interfaces.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1B illustrates an example of the device of FIG. 1A, with one or more cameras mounted on the device.

FIGS. 2A-2C are illustrative examples of adaptive display of UI elements on a device and demonstrate use of a human hand to select the elements.

FIGS. 3A-3C are further illustrative examples of adaptive display of UI elements on a device and show use of a stylus to select the elements.

FIGS. 4A-4C present another set of illustrative examples of adaptive display of UI elements on a device in which a stylus is used to select the elements.

FIGS. 5A-5C are further illustrative examples of adaptive display of UI elements on a device.

FIGS. 6A-6C are still further illustrative examples of adaptive display of UI elements on a device.

FIGS. 7A-7C show yet another set of illustrative examples of adaptive display of UI elements on a device.

FIGS. 8A-8E are further illustrative examples of adaptive display of UI elements on a device.

FIGS. 9A-9C provide more illustrative examples of adaptive display of graphic elements on a device.

DETAILED DESCRIPTION

Figure 1A:
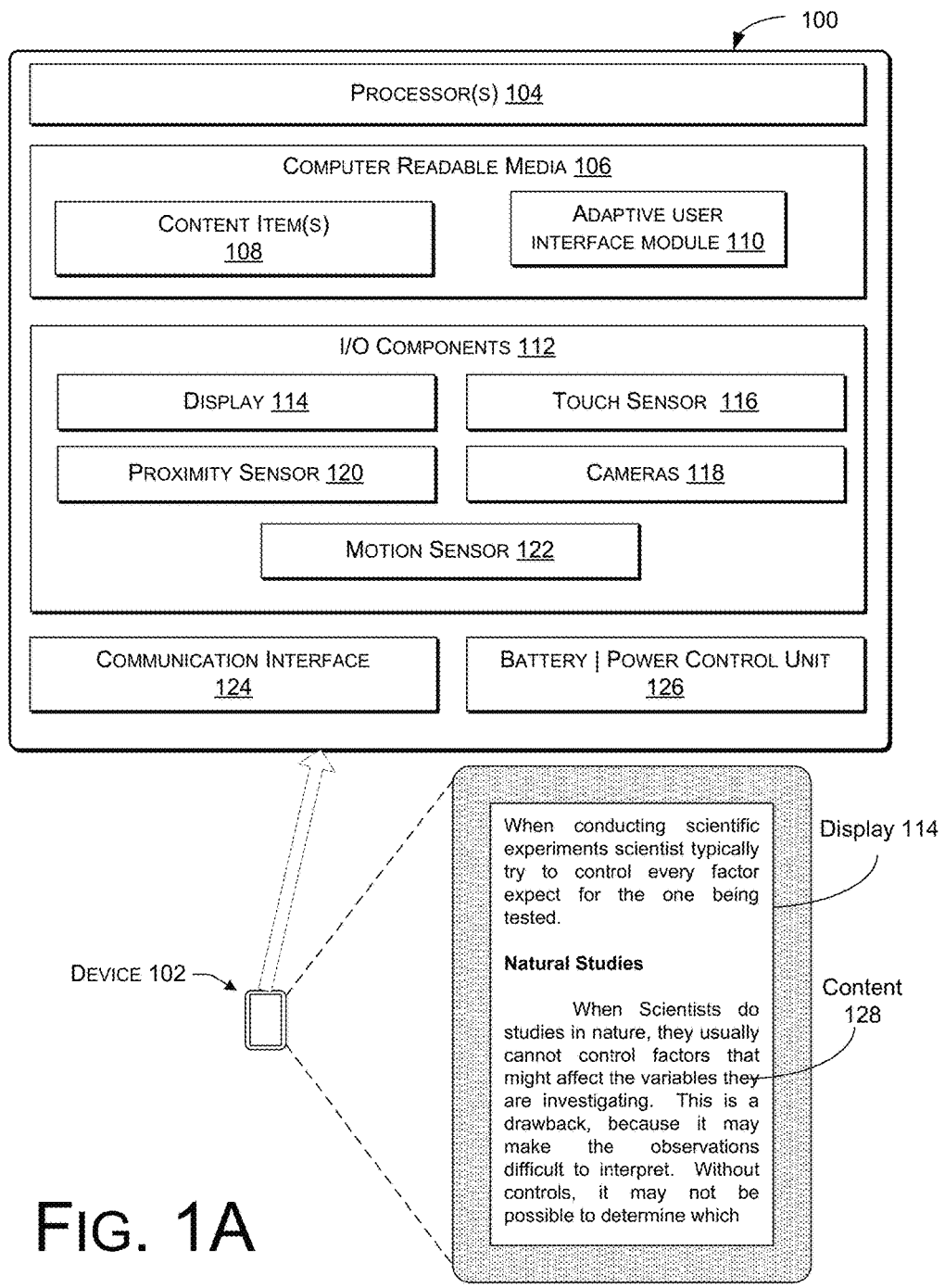
FIG. 1A illustrates an example architecture of a device configured to provide adaptive or dynamic display of user interface (UI) elements, based on proximity sensing.

Described herein are devices and techniques for adaptively and dynamically displaying graphic elements (e.g., user interface (UI) elements, pop-up graphical elements, etc.) on a display of a device, based on sensing proximity of an input device (e.g., a hand of a user, a stylus, etc.) to the display of the device. The display may be, for example, a touch screen display.

A user may interact with a touch screen display by, for example, touching an icon displayed on the display with one or more fingers, a stylus, or any other appropriate input device. Because of a relatively large size of a fingertip of the user's hand, it may be desirable that a size of the icon is relatively large, e.g., to enable the user to accurately touch the desired icon (and to avoid inadvertently touching an adjacent icon). However, such large icons may take up useful space of the display. Accordingly, it may be desirable to adaptively display various UI elements, e.g., various icons, only when it is anticipated that the user may soon touch a UI element.

For instance, in some examples, the device may comprise a proximity sensor to sense when an input device is brought near the display of the device. In one example, the proximity sensor may also estimate a distance between the input device and the display of the device.

In one implementation, proximity sensing may be used to trigger display of one or more UI elements. That is, when the proximity sensor does not sense an input device being proximal to the display, various UI elements may be minimized or hidden. Since no input device is detected as being proximal to the display, it is deemed highly unlikely for an input device to touch a UI element on the touch screen display. When the proximity sensor senses an input device being proximal to the display, one or more UI elements may be displayed on the display, in anticipation of a desire of the user to use the input device to possibly touch a displayed UI element. Thus, various UI elements are adaptively displayed on the display, based on the proximity sensor sensing the input device being proximal to the display.

In another implementation, the size of one or more UI elements may be dynamically adjusted based on proximity of an input device. More specifically, when the proximity sensor does not sense an input device being proximal to the display, various UI elements may be displayed at a size that may be relatively small. When the proximity sensor senses an input device being proximal to the display, one or more UI elements may be displayed on the display with a relatively large size. That is, the displayed UI elements are enlarged, based on the proximity sensor sensing the input device being proximal to the display.

In another implementation, the displayed UI elements may grow larger, as the input device is brought closer to the display. For example, the size of the displayed UI elements may be inversely proportional to a distance between the input device and the display, as detected by the proximity sensor. Thus, as the input device is brought closer to the display, the size of the displayed UI elements increases.

In another implementation, when the proximity sensor does not sense an input device being proximal to the display, a UI element may be displayed in the form of text, which may require less space to be displayed. When the proximity sensor senses an input device being proximal to the display, the UI element may be displayed in the form of an icon with a relatively large size.

In another implementation, when the proximity sensor does not sense an input device being proximal to the display, multiple UI elements may be displayed at a relatively small size. As the proximity sensor begins to sense an input device being proximal to the display, and perhaps additionally senses that the input device is over a specific UI element, the specific UI element (or the specific UI element, along with one or more adjacent UI elements) may be enlarged, while not enlarging or while shrinking all of the other UI elements (or at least one or more of the other UI elements). Such selective enlargement may result in at least some UI elements being shrunken or not being enlarged, thereby resulting in increased space for displaying other meaningful content on the display.

In still another implementation, the proximity sensor may sense an input device being proximal to the display, and may also sense the input device being over a specific area of the display, where the specific area displays a specific phrase, text, picture, or the like. Based on such sensing, a pop-up graphical element may be displayed adjacent to the specific phrase, text, or picture, where the pop-up graphical element may provide additional content associated with the specific phrase, text, or picture.

These are just some of the possible implementations. For purposes of discussion, the various implementations are described in the context of a portable electronic device. However, aspects described herein may be implemented in essentially any environment where an electronic display employs a touch user interface.

FIG. 1A illustrates an example architecture 100 of a device 102 configured to provide adaptive or dynamic display of UI elements, based on proximity sensing. In general, the device 102 may be implemented as any type of electronic device having a touch screen display and having proximity sensing capability. For example, the device 102 may include computing devices or electronic devices, for example, an electronic book ("eBook") reader, a cellular telephone, a smart phone, a portable media player, a tablet computer, a wearable computer, a laptop computer, a netbook, a desktop computer, a kiosk, an Automated Teller Machine (ATM), an appliance, automotive electronics, an augmented reality device, industrial display devices, and so forth. For example, FIG. 1B illustrates various example forms the device 102 may take, e.g., a laptop, a cellular phone, a kiosk, an e-book reader, a tablet, or a desktop computer.

The device 102 may include or access components such as at least one or more control logic circuits, central processing units, or processors 104, and one or more computer-readable media 106 to perform various functions of the device 102. Additionally, each of the processors 104 comprises one or more processors or processing cores.

Depending on the configuration of the device 102, the computer-readable media 106 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 104.

Various instructions, information, data stores, and so forth may be stored within the computer-readable media 106 and configured to execute on the processors 104. For instance, the computer-readable media 106 may store one or more electronic content items 108 and one or more applications. In some examples, the applications may include instructions, which when executed by the processors 104, cause the device 102 to perform various functions. For example, the applications may include an application to cause the content items 108 to be presented to a user on a display 114 of the device 102. In an example, the applications may include an adaptive UI module 110 (henceforth also referred to as "UI module 110") configured to adaptively or dynamically display various graphic elements (e.g., UI elements) on the display 114, e.g., based on sensing a proximity of a user's hand or a stylus (or other similar input devices) from the display 114, as will be discussed in detail herein later.

The device 102, generally, includes one or more input/output (I/O) components 112 for presenting information or data to the user and/or for receiving information or data, e.g., via user inputs. The I/O components 112 may include one or more output components, such as the display 114, and one or more input components, such as a touch sensor 116, one or more imaging devices, e.g., cameras, 118, a proximity sensor 120, a motion sensor 122, and/or the like. Although not illustrated in FIG. 1A, the I/O components 112 may also include one or more other input components, such as a keyboard, a keypad, a joystick, a mouse, a touch pad, a drawing pad, control buttons, and/or the like.

In an embodiment, the display 114 is a touch-sensitive display, or a touch screen display. For instance, in an illustrated example, the display 114 may present information, such as electronic content items, to a user. FIG. 1A illustrates example content 128 displayed on the display 114.

For convenience, the display 114 is shown in FIG. 1A (and various other subsequent figures) in a generally rectangular configuration. However, it should be understood that the display 114 may be implemented in any shape, and may have any ratio of height to width. Also, for stylistic or design purposes, the display 114 may be curved or otherwise non-linearly or non-planarly shaped. Furthermore, the display 114 may be flexible and configured to fold or roll.

The touch sensor 116 may accept input resulting from contact and/or application of incident force, such as a user finger or stylus touching or pressing upon the display 114. In some specific implementations, the device 102 may be configured to receive user inputs by communicating with an active stylus. For example, the active stylus and the device 102 may actively exchange data related to the user inputs, via the display 114, based on the touch sensor 116 sensing a touch of the stylus on the display 114.

The touch sensor 116 may be coupled to a touch layer (not shown), such as an indium tin oxide (ITO) layer arranged in a grid pattern below the top surface of the display 114. In this case, the touch sensor 116 may be configured to determine characteristics of user interaction with the display 114 detected by the ITO layer. These characteristics may include the location of the touch on the display 114, magnitude of the force, shape of the touch, and so forth.

The cameras 118 may be configured to, among other functions, take pictures and/or video of a user, e.g., while the user interacts with the device 102. Such pictures and/or the video may be used to, for example, track movements of a stylus, a user's hand, face, eye, etc., and/or identify gestures associated with movement of the stylus, hand, face or eye. For example, the user may perform specific pre-determined gestures to control the device 102. For example, a user may swipe a finger from right to left, to indicate that the user desires to read a next page of an e-book displayed on the display 114. The cameras 118 may capture such a movement of the finger, and an application program may recognize the gesture and display the next page of the e-book on the display 114.

In an embodiment, more than one camera may be included in the device 102. As an example, four cameras may be mounted on four edges of the device 102, to accurately capture movements in front of the device 102. In another example, one or more of the cameras 118 may be located behind the display 114 (e.g., may be embedded below a top layer of the display 114). Although such one or more of the cameras 118 located behind the display 114 may not be visible to the user, such cameras may be able to detect a movement of an input device, such as the user's finger or a stylus, relative to the device 102. For example, FIG. 1B illustrates an example of the device 102, with cameras 118*a*, ..., 118*e* mounted on the device 102. In the example of FIG. 1B, four cameras 118*a*, ..., 118*d* are mounted on four edges of the device 102, and a camera 118*e* is located behind the display 114 (e.g., may be embedded below a top layer of the display 114). Although FIG. 1B illustrate five cameras, the device 102 may have any different number of cameras mounted on any appropriate position in the device 102.

The proximity sensor 120 may detect proximity, orientation and/or position of an input device, such as the user's finger or a stylus, relative to the device 102. Any appropriate type of proximity sensor may be used.

As an example, the proximity sensor 120 may comprise a magnetometer, electrical field sensors, etc., for detecting the orientation and position of an input device, such as the user's finger or stylus, relative to the device 102. The proximity sensor 112 may allow for the detection and characterization of an impinging magnetic field generated by a magnetic stylus coming into proximity with the display 114. For example, a magnetometer may be configured to determine a field strength, angular bearing, and polarity of the magnetic field. In some implementations, the proximity sensors 112 may include one or more Hall-effect sensors to determine the presence, position, orientation, rotation, and so forth of the magnetic field generated by the magnetic stylus coming into proximity with the display 106.

In another example, an input device may comprise, for example, a wearable device (e.g., a special gloves worn by a user). The wearable device may comprise a dedicated circuit (e.g., a near field communication (NFC) chip), and the proximity sensor 120 may comprise a sensor (e.g., a NFC reader) that may detect a presence of the dedicated circuit in the wearable device proximally to the proximity sensor 120, and also estimate a distance between the proximity sensor 120 and the dedicated circuit in the wearable device.

In another example, the proximity sensor 120 may comprise a plurality of generators configured to generate infrared (IR) light, or generate laser beams. For example, the IR light or the laser beams may be generated in one or more grid like patterns over the display 114. Whenever an input device (e.g., a hand of a user, a stylus, etc.) enters at least one of the one or more grid like patterns, such entrance is detected by the proximity sensor 120.

In yet another example, the cameras 118 may act as the proximity sensor 120 or provide input to the proximity sensor 120. For example, pictures and/or the videos taken by the cameras may be analyzed to detect proximity, orientation and/or position of an input device, such as the user's finger or a stylus, relative to the device 102. Further, the touch sensor 116 may, in some implementations, function as the proximity sensor 120 or provide input to the proximity sensor 120.

Any other appropriate type of proximity sensor to sense proximity, orientation and/or position of an input device, may also be used. Examples of such proximity sensors may include a capacitive proximity sensor, a Doppler effect based proximity sensor, an Eddy-current based proximity sensor, an inductive proximity sensor, a magnetic proximity fuse, a passive optical (such as charge-coupled devices) proximity sensor, a passive thermal infrared proximity sensor, a photocell (reflective) based proximity sensor, a radar based proximity sensor, a proximity sensor based on reflection of ionizing radiation, a sonar (typically active or passive) based proximity sensor, an ultrasonic sensor, and/or the like.

The motion sensor 122 may detect motion of an object, e.g., an input device (such as the user's finger or a stylus), relative to the device 102. Any appropriate type of motion sensor may be used. For example, the motion sensor 122 may comprises an infrared light based motion sensor, a Doppler effect based motion sensor, an ultrasonic wave based motion sensor, a tomographic motion detector, and/or the like. In another example, the cameras 118 may act as a motion sensor, in which pictures and/or video takes by the cameras 118 may be analyzed to detect motion of an object moving in front of the display 114.

The device 102 may also include one or more communication interfaces 124 to facilitate communication between one or more networks (such as the Internet® network or one or more local area networks), directly with one or more devices, and/or with one or more cloud services (such as the cloud-based discovery service and/or the cloud-based relay service). The communication interfaces 124 may also facilitate communication between one or more wireless access points, a master device, and/or one or more other computing devices as part of an ad-hoc or home network system. The communication interfaces 124 may support both wired and wireless connection to various networks, such as cellular networks, radio, Wi-Fi networks, short-range or near-field networks (e.g., Bluetooth® technology), infrared signals, local area networks, wide area networks, the Internet, and so forth. The device 102 may also include a power source, e.g., battery, and power control unit 126, e.g., to control power supplied to the device 102.

FIGS. 2A-2C are illustrative examples of adaptive display of UI elements 204 on the device 102. FIG. 2A illustrates the display 114 of the device 102, with content 128 being displayed on the display 114. In the example of FIGS. 2A-2C, the content 128 being displayed on the display 114 comprises a portion of a text, e.g., a portion of an e-book, an article, a document, or the like. In the example of FIG. 2A, the proximity sensor 120 has not detected any input device (e.g., a hand of a user, a stylus, or any other external object) being proximally located to the display 114 (or the motion sensor 122 has not detected any motion proximal to the display 114). Based on the proximity sensor 120 not detecting any input device being proximally located to the display 114 (or the motion sensor 122 not detecting any motion proximal to the display 114), the UI module 110 refrains from displaying one or more graphic elements, e.g., one or more UI elements (e.g., icons, control buttons, etc.) on the display 114.

FIG. 2B illustrates an input device 202, such as a hand of a user in this example, being proximally located to the device 102. For example, in FIG. 2B, a user brings her hand closer or proximal to the device 102, such that the hand is less than a threshold distance from the device 102. FIG. 2B illustrates a side view of the device 102, such that a distance between the input device 202 and the display 114 of the input device 102 is illustrated. The length of the threshold distance may vary depending upon implementation and types of proximity sensors used, but generally the threshold distance might be within a few inches. The proximity sensor 120 detects the input device 202 being proximally located to the display 114, and/or the motion sensor 122 detects motion near the display 114. As the proximity sensor 120 detects the input device 202 near the display 114, the device 102 interprets this as being highly likely that the user intends to touch the touch screen of the display 114 to activate a UI element. Accordingly, based on the proximity sensor 120 detecting the input device 202 being proximally located to the display 114 (or based on the motion sensor 122 detecting motion proximal to the display 114), the UI module 110 displays one or more UI elements 204 (e.g., icons, control buttons, etc.) on the display 114, as illustrated in FIG. 2C.

In the example of FIG. 2C, the UI elements 204 are in the form of six icons, e.g., an icon for saving a document, an icon for printing the document, an icon for changing a font of the document, an icon for opening a new file, an icon for moving to a next page of the document, and an icon for moving to a previous page of the document. In an example, a size of the displayed UI elements 204 are relatively large, such that the user's hand may easily and relatively accurately touch one of the UI elements 204 (e.g., without inadvertently touching an adjacent icon).

In FIG. 2A, none of the UI elements 204 are displayed (e.g., the UI elements 204 are hidden or minimized in FIG. 2A), thereby generating more space for rendering the content 128 on the display 114. The UI elements 204 may be adaptively or dynamically displayed, that is, displayed only when required, when it is anticipated that the input device 202 may actually touch the display 114. Not displaying the UI elements 204 at all times (e.g., selectively hiding or minimizing the UI elements 204) may result in increased space for displaying the content 128 on the display 114 when an input device 202 is not proximally located to the display 114.

As illustrated in FIG. 2C, the UI elements 204 may be overlaid on the contents 128 such that the UI elements 204 obscure or hide at least a part of the content 128. However, in another example and although not illustrated in FIG. 2C, the content 128 may be shifted or relocated on the display 128, so that the UI elements 204 are not overlaid on the content 128.

After the UI elements 204 are displayed on the display 114, the input device 202 may touch a UI element on the display 114, based on which an action associated with the corresponding UI element may be initiated (e.g., by an application program stored in the device 102). For example, based on the user's hand touching the print icon, a printing process to print the content 128 may be initiated.

Although FIGS. 2A-2C and various other figures herein have been discussed with respect to adaptively or dynamically displaying UI elements, any other type of graphic elements (e.g., pop-up texts, pictures, hyper-links, and/or the like) may also be adaptively displayed based on proximity sensing, as will be readily understood by those skilled in the art based on the teachings provided herein.

For at least some of the figures discussed herein, adaptive display of UI elements is based on the proximity sensor 120 sensing proximity of an input device to the display 114. However, such adaptive display of UI elements may be based on the motion sensor 122 detecting motion near the display 114, and/or the imaging devices 118 detecting an input device proximal to the display 114, in addition to, or instead of being based on the proximity sensor 120 sensing proximity of the input device to the display 114.

FIGS. 3A-3C are illustrative examples of adaptive display of UI elements 304 on the device 102. FIGS. 3A-3C are at least in part similar to FIGS. 2A-2C, except a stylus is used as an input device 302 instead of the user's hand.

FIG. 3A illustrates the display 114 of the device 102, with content 128 being displayed on the display 114. Similar to FIG. 2A, in the example of FIG. 3A, the proximity sensor 120 has not detected any input device (e.g., a hand of a user, a stylus, or any other external object) being proximally located to the display 114. Based on the proximity sensor 120 not detecting any input device being proximally located to the display 114, the UI module 110 refrains from displaying one or more UI elements (e.g., icons, control buttons, etc.) on the display 114. For example, one or more UI elements may be hidden or minimized.

FIG. 3B illustrates the input device 302, e.g., a stylus, being proximally located to the device 102 (e.g., less than a threshold distance from the device 102). Based on the proximity sensor 120 detecting the input device 302 being proximally located to the display 114, the UI module 110 displays one or more UI elements 304 on the display 114, as illustrated in FIG. 3C.

A tip of a stylus is usually smaller than a fingertip of a hand of a user. For example, it may be relatively easy for a user to accurately touch a UI element on the display 114 using a stylus, compared to accurately touching the UI element on the display 114 using his or her hand or fingertip. Accordingly, in FIGS. 2B and 2C, when the proximity sensor 120 detects a user's hand as the input device 202 (e.g., based on the cameras 118 taking pictures or video of the user's hand approaching the display 114), the displayed UI elements 204 may be of relatively large size (because, if the UI elements 204 are of smaller size, it may be difficult for the user's hand or fingertip to touch a UI element, without inadvertently touching an adjacent UI element). On the other hand, in FIGS. 3B and 3C, when the proximity sensor 120 detects a stylus as the input device 302 (e.g., based on the cameras 118 taking pictures or video of the stylus approaching the display 114, based on a magnetometer of the device 102 detecting a magnetic tip of the stylus approaching the display 114, and/or the like), the displayed UI elements 304 may be of relatively smaller size (because, even if the UI elements 304 are of smaller size, it may be relatively easy for the tip of the stylus to touch a UI element, without inadvertently touching an adjacent UI element). Displaying the UI elements 304 with relatively smaller size results in more space in the display 114 for displaying the content 128. Thus, based on the device 102 detecting a type of the input device that is located proximally to the display 114, the UI module 110 may adaptively change a format of the displayed UI elements.

In the example of FIG. 3C, the content 128 may be shifted or relocated on the display 128 while the UI elements 304 are being displayed, e.g., so that the UI elements 304 are not overlaid on the content 128. However, in another example and although not illustrated in FIG. 3C, the UI elements 304 may be overlaid on the contents 128 (e.g., such that the UI elements 304 obscure or hide at least a part of the content 128).

After the UI elements 304 are displayed on the display 114, the input device 302 may touch a UI element on the display 114, based on which an action associated with the corresponding UI element may be initiated (e.g., by an application program stored in the device 102). For example, based on the stylus touching the print icon, a printing process to print the content 128 may be initiated.

FIGS. 4A-4C are illustrative examples of adaptive display of UI elements 304 on the device 102. FIGS. 5A-5C are at least in part similar to FIGS. 2A-2C and 3A-3C. However, in FIGS. 2C and 3C, the displayed UI elements were for controlling the content 128 (e.g., were for controlling an application program associated with the content 128). In contrast, in FIG. 4C, the displayed UI elements 404 are global UI elements associated with controlling operations of the device 102. For example, the UI elements 404 comprise a home icon of the device 102, a back icon (for going to a previous screen), a menu icon, and a search icon. The UI elements 404 are displayed on a bottom portion of the display 114, whereas at least some of the UI elements 204 and 304 were displayed on a top portion of the display 114. In FIG. 4C, the global UI elements 404 (e.g., instead of the UI elements 204 and 304) may be displayed based on, for example, the proximity sensor 120 sensing that the input device 402 is proximal to the bottom portion of display 114. Although not illustrated in FIG. 4C, in addition to the global UI elements 404, the UI elements 204 and 304 may also be displayed on the display 114.

FIGS. 5A-5C are illustrative examples of adaptive display of UI elements on the device 102. FIGS. 5A-5C are at least in part similar to FIGS. 2A-2C. For example, FIG. 5A illustrates the display 114 of the device 102, with content 128 being displayed on the display 114, and without an input device being detected to be proximal to the display 114. Unlike FIG. 2A, however, even when an input device is not detected to be proximal to the display 114, UI elements 504*a* are displayed on the display 114. The UI elements 504*a* displayed on the display 114 are of relatively smaller size.

FIG. 5B illustrates an input device 502, e.g., a hand of a user, being proximally located to the device 102. The proximity sensor 120 detects the input device 502 being proximally located to the display 114. Based on the proximity sensor 120 detecting the input device 502 being proximally located to the display 114, the UI module 110 displays UI elements 504*b*. In an example, the UI elements 504*a* and 504*b* are the same UI elements, but the size of the UI elements 504*b* is larger than the size of the UI elements 504*a*. Thus, for example, based on the proximity sensor 120 detecting the input device 502 being proximally located to the display 114, the UI module 110 increases a size of the UI elements displayed on the display 114 (e.g., to enable the user's hand or fingertip to easily and relatively accurately touch one of the UI elements 504*b*, without inadvertently touching an adjacent UI element). That is, a format of the UI elements displayed on the display 114 changes, based on the proximity sensor 120 detecting the input device 502 being proximally located to the display 114. When an input device is not proximally located to the display 114, the displayed UI elements are of smaller size, thereby reserving more space for displaying the content 128 on the display 114.

FIGS. 6A-6C are illustrative examples of adaptive display of UI elements on the device 102. FIGS. 6A-6C are at least in part similar to FIGS. 2A-2C. For example, FIG. 6A illustrates the display 114 of the device 102, with content 128 being displayed on the display 114, and without an input device being detected to be proximal to the display 114. Unlike FIG. 2A, however, even when an input device is not detected to be proximal to the display 114, UI elements 604*a* may be displayed on the display 114. In the example of FIG. 6A, the UI elements 604*a* may be in the form of textual icons. For example, a first one of the UI elements 604*a* comprises the text "Save," a second one of the UI elements 604*a* comprises the text "Print," and so on, and are associated with saving and printing a document, respectively.

FIG. 6B illustrates an input device 602, e.g., a hand of a user, being proximally located to the device 102. The proximity sensor 120 may detect the input device 602 being proximally located to the display 114, and accordingly, the UI module 110 may display UI elements 604*b* on the display 114. In an example, the UI elements 604*b* comprise graphical icons, which may correspond to the textual icons of the UI elements 604*a*. For example, a first one of the UI elements 604*b* comprises a graphical icon for saving a document, a second one of the UI elements 604*b* comprises a graphical icon for printing, and so on. In an example, a graphical icon of one of the UI elements 604*b* is larger in size than a corresponding textual icon of a corresponding one of the UI elements 604*a*.

Thus, when an input device is not proximally located to the display 114, the displayed UI elements are in the form of text, and of smaller size, thereby reserving more space for displaying the content 128 on the display 114. When the proximity sensor 120 detects the input device 602 being proximally located to the display 114, the UI module 110 changes the textual icons of the UI elements to corresponding graphical icons (e.g., to enable the user's hand or fingertip to easily and relatively accurately touch one of the UI elements 604*b*). That is, a format of the UI elements displayed on the display 114 changes (e.g., from textual icons to graphical icons), based on the proximity sensor 120 detecting the input device 602 being proximally located to the display 114.

FIGS. 7A-7C are illustrative examples of adaptive display of UI elements on the device 102. FIGS. 7A-7C are at least in part similar to FIGS. 2A-2C. For example, FIG. 7A illustrates the display 114 of the device 102, with content 128 being displayed on the display 114, and without an input device being detected to be proximal to the display 114. Unlike FIG. 2A, however, even when an input device is not detected to be proximal to the display 114, a plurality of UI elements 704*a*1, 704*a*2, 704*a*3 and 704*a*4 may be displayed on the display 114. The UI elements 704*a*1 and 704*a*3 may be adjacent or neighboring to the UI element 704*a*2 on the display 114, while the UI element 704*a*4 may not be adjacent to the UI element 704*a*2. The displayed UI elements 704*a*1, 704*a*4 may have a first appearance. For example, the first appearance may correspond to the UI elements having a corresponding first size, a corresponding first font, a corresponding first color, a corresponding first format, a corresponding first animation, whether the UI elements are displayed or not, etc. In some examples, displaying the UI elements 704*a*1, . . . , 704*a*4 with the first appearance comprises displaying the UI elements 704*a*1, . . . , 704*a*4 with a same size, e.g., a first size.

FIG. 7B illustrates an input device 702, e.g., a hand of a user, being proximally located to the device 102. In an example, the proximity sensor 120 may detect the input device 702 being proximally located over one of the UI elements displayed on the display 114, e.g., hovering over the UI element 704*a*2. Accordingly, the UI module 110 may enlarge the UI element 704*a*2 to generate a larger sized UI element 704b2 (e.g., generate the UI element 704b2 to have a second size that is larger than the first size), as illustrated in FIG. 7C. That is, the UI module 110 may display the UI element 704a2 as the UI element 704b2 having a second appearance (e.g., having the second size, a corresponding second font, a corresponding second color, a corresponding second format, a corresponding second animation, and/or the like).

In some examples, the UI module 110 may also enlarge the UI elements 704a1 and 704a3 (i.e., the UI elements neighboring the UI element 704a2) to respectively generate UI elements 704b1 and 704b3 such that each of the UI elements 704b1 and 704b3 has a third size that is larger than the first size of UI elements 704a1 and 704a3, but smaller than the second size of UI element 704b2, e.g., as illustrated in FIG. 7C. For example, the UI module 110 may display the UI elements 704a1 and 704a3 as the UI elements 704b1 and 704b3, respectively, having a third appearance (e.g., having the third size, a corresponding third font, a corresponding third color, a corresponding third format, a corresponding third animation, and/or the like).

In some examples, the UI module 110 may shrink the UI element 704a4 to generate a smaller UI element 704b4 having a fourth size, which is smaller than the first size of UI element 704a4. For example, the UI module 110 may display the UI element 704a4 as the UI element 704b4, having a fourth appearance (e.g., having the fourth size, a corresponding fourth font, a corresponding fourth color, a corresponding fourth format, a corresponding fourth animation, and/or the like).

In some other examples and although not illustrated in FIG. 7C, the UI module 110 may not change the appearance (e.g., size) of any UI elements that are not adjacent to the UI element above which the input device 702 is hovering (e.g., not change the appearance of the UI element 704a4, which is not adjacent to the UI element 704a2, above which the input device 702 is hovering), based on proximity sensing.

Thus, FIG. 7C illustrates enlargement of the UI element 704a2 by a first amount, enlargement of the UI elements neighboring the UI element 704a2 by a second amount that is smaller than the first amount, and shrinking of the UI elements that are not neighboring the UI element 704a2 by a third amount, based on the proximity sensor 120 detecting the input device 702 is proximally located over the UI element 704a2 and/or detecting that the input device 702 is likely to touch the UI element 704a2. This may be based on an assumption that, as the input device 702 is detected to be located over the UI element 704a2, it may be most likely that the input device 702 would touch the UI element 704a2 eventually, but also may likely touch the adjacent UI elements (but less likely to touch UI elements that are not neighboring the UI element 704a2). The UI elements that are selected for enlargement may be selectively modified, as the user continues to bring his or her hand closer to the display 114 (i.e., as and when it becomes more clear as to which icon the user is to likely touch). Alternatively, the UI module 110 may not change the appearance (e.g., size) of any UI elements other than the UI element, e.g., UI element 704a2, above which the input device 702 is hovering, based on proximity sensing.

In some examples, an amount of enlargement and/or an amount of shrinkage of the UI elements, as discussed with respect to FIGS. 7A and 7C, may be based on a distance between the input device 702 and the display 114, as estimated by the proximity sensor 120. For example, as the distance between the input device 702 and the display 114 decreases, a size of the UI element 704b2 may increase (e.g., the size of the UI element 704b2 may be inversely proportional to the estimated distance between the input device 702 and the display 114). That is, the difference between the sizes of the UI elements 704a2 and 704b2 may be based on (e.g., inversely proportional to) the distance between the input device 702 and the display 114, as estimated by the proximity sensor 120. The size of the UI element 704b2 may increase gradually, continuously or at regular intervals, as the input device 702 is being brought closer to the display 114. The sizes of the UI elements 704b1 and 704b3 may, similarly, be based on the distance between the input device 702 and the display 114. In some examples, as the distance between the input device 702 and the display 114 decreases, a size of the UI element 704b4 may decrease (e.g., the size of the UI element 704b4 may be proportional to the estimated distance between the input device 702 and the display 114). The size of the UI element 704b4 may decrease gradually, continuously or at regular intervals, as the input device 702 is being brought closer to the display 114.

Figure 8D:
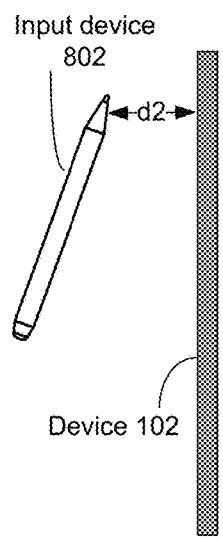

FIGS. 8A-8E are illustrative examples of adaptive display of UI elements on the device 102. FIGS. 8A-8E are at least in part similar to FIGS. 3A-3C. For example, FIG. 8A illustrates the display 114 of the device 102, with content 128 being displayed on the display 114, without an input device being detected to be proximal to the display 114, and without any UI elements being displayed on the display 114.

FIG. 8B illustrates an input device 802, e.g., a stylus, being proximally located to the device 102 at a distance d1, which is less than a first threshold distance, but more than a second threshold distance. FIG. 8C corresponds to FIG. 8B in that the stylus is detected at the distance d1, or at a distance that is less than the first threshold distance, but more than the second threshold distance. In response, the UI elements 804a may be displayed on the display 114. In an example, the size of the UI elements 804a may be relatively small.

Figure 8E:
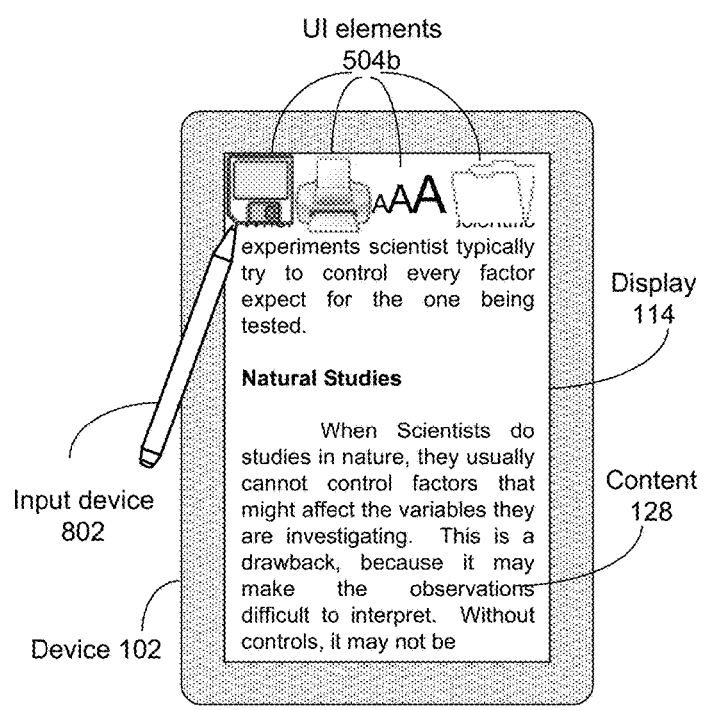

As the user brings the stylus closer to the display, the proximity sensor 120 may detect the stylus to be located at a distance d2 from the display 114, as illustrated in FIG. 8D. Distance d2, for example, is less than the distance d1. Distance d2, for example, is less than the second threshold distance. FIG. 8E corresponds to FIG. 8D, i.e., in FIG. 8E, the stylus is detected at the distance d2, or at a distance that is less than the second threshold distance. In response to the proximity sensor 120 detecting the stylus at the distance d2, UI elements 804b may be displayed on the display 114. In an example, the UI elements 804a and 804b may be the same UI elements, but having different sizes. For example, the size of the UI elements 804b may be relatively large, e.g., larger than the size of the UI elements 804a. That is, as the stylus gets closer to the display 114, the displayed UI elements may become larger.

Although FIGS. 8A-8E illustrate only two level of granularity (e.g., two sizes of the UI elements, corresponding to the distances d1 and d2), more than two levels of granularity may also be possible. For example, the size of the displayed UI elements may increase gradually, continuously or at regular intervals, as the input device 802 is being brought closer to the display 114. That is, the size of the displayed UI elements may be roughly inversely proportional to the detected distance between the input device 802 and the display 114.

In a computing device that has a mouse as an input device, when a mouse pointer hovers over a specific area of a display (e.g., without clicking on the specific area of the display), a graphical element may be activated. For example, a pop-up text, explaining a meaning of a phrase or providing addition details about the phrase, may be displayed when the mouse pointer moves over the phrase on a web browser. However, in a device with a touch screen (e.g., the device 102 with the touch screen display 114), a user may not use a mouse, and hence, such mouse hovering feature may not be possible. However, in an example, the mouse hovering feature may be emulated using proximity sensing. For example, when a user moves an input device near a specific area of the display 114, the proximity sensor 120 may sense the proximity of the input device over the specific area of the display 114, and the UI module 110 may display an associated graphic element on the display 114. For example, FIGS. 9A-9C are illustrative examples of adaptive display of graphic elements on the device 102. FIGS. 9A-9C are at least in part similar to FIGS. 3A-3C. For example, FIG. 9A illustrates the display 114 of the device 102, with content 128 being displayed on the display 114, and without an input device being detected to be proximal to the display 114. FIG. 9B illustrates an input device 902, e.g., a stylus, being proximally located to the device 102. For example, the stylus may be detected to be located over or near a word "scientist" of the content 128. Based on the proximity sensor 120 detecting the input device 902 being proximally located to the display 114 and over the word "scientist," the UI module 110 may display a graphical element associated with the word "scientist." For example, the graphical element may provide a meaning of the word "scientist" (e.g., as illustrated in FIG. 9C), provide a hyper-link that provides further details on word "scientist," display an advertisement associated with the word "scientist," provide any other pop-up text, and/or the like. Thus, based on proximity sensing, the UI module 110 mimics the behavior of mouse hovering, by displaying a pop-up text or the like when the stylus is detected to be located proximally over the word "scientist." Although FIG. 9C illustrates displaying a text associated with the word scientist, any appropriate graphical element may be displayed, e.g., a UI element, a pop-up text, a control button, an icon, an image, and/or the like.

Figure 10:
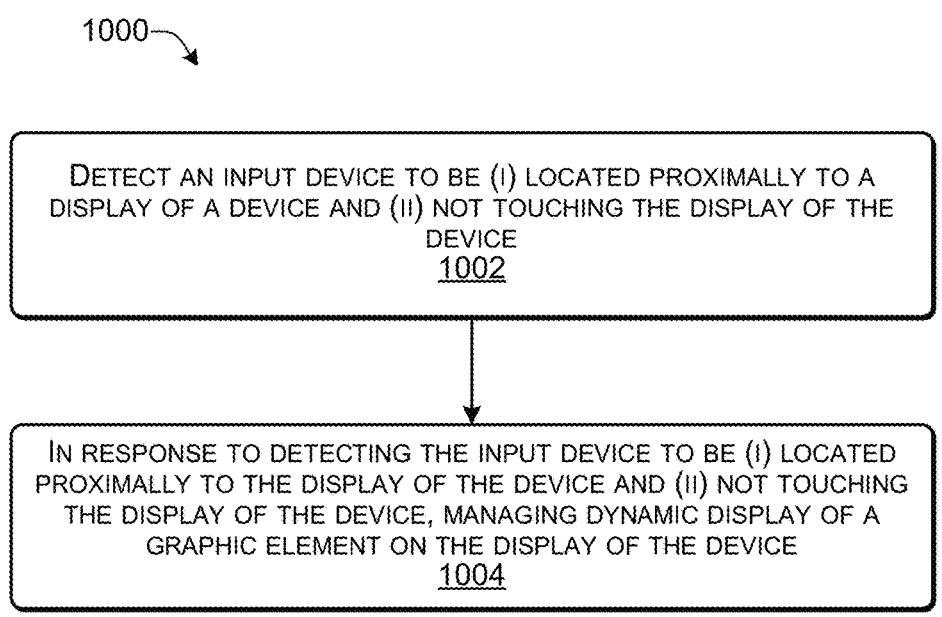
FIG. 10 illustrates an example flow diagram showing an illustrative process for adaptive display of UI elements on a device.
Figure 11:
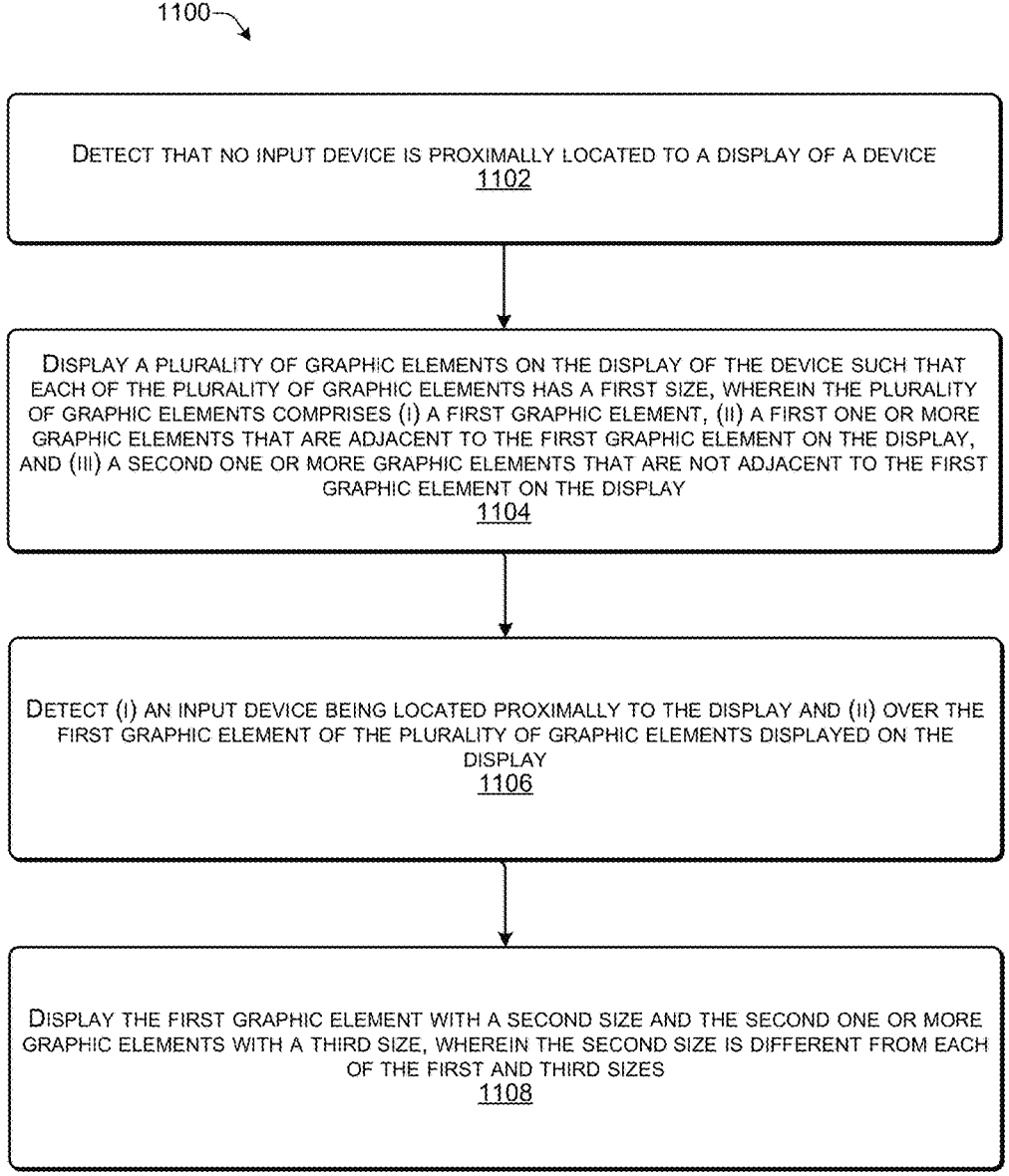
FIG. 11 illustrates an example flow diagram showing another illustrative process for adaptive display of graphic elements on a device.

FIG. 10 illustrates an example flow diagram showing an illustrative process 1000 for adaptive display of graphic elements on a device. FIG. 11 illustrates an example flow diagram showing an illustrative process 1100 for adaptive display of graphic elements on a device. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Referring to FIG. 10, at 1002, an input device (e.g., one of the input devices 202, . . . , 902 of FIGS. 2B, . . . , 9B, respectively) may be detected to be (i) located proximally to a display (e.g., display 114) of a device (e.g., device 102) and (ii) not touching the display of the device. For example, the proximity sensor 120, the cameras 118 and/or the motion sensor 122 may perform such detection.

At 1004, in response to detecting the input device to be (i) located proximally to the display of the device and (ii) not touching the display of the device, dynamic display of a graphic element on the display of the device may be managed. In an example, a distance between the input device and the display of the device may be detected, and the graphic element may be displayed on the display of the device such that a format and/or a size of the displayed graphic element are based on the detected distance. In an example, a type of the input device may also be detected, and the graphic element may be displayed on the display of the device such that a format and/or a size of the displayed graphic element are based on the detected type of the input device. In another example, prior to such detection, the graphic element may be hidden; and upon such detection, the graphic element may be displayed on the display of the device. In another example, prior to such detection, the graphic element may be displayed on the display with a smaller size; and upon such detection, the displayed graphic element may be enlarged.

Referring to FIG. 11, at 1102, no input device is detected to be proximally located to a display (e.g., display 114) of a device (e.g., device 102). At 1104, in response to detecting that no input device is proximally located to the display of the device, a plurality of graphic elements (e.g., UI elements 704a1, . . . , 704a4 of FIG. 7A) are displayed on the display of the device such that each of the plurality of graphic elements has a first size. The plurality of graphic elements comprises (i) a first graphic element (e.g., UI element 704a2), (ii) a first one or more graphic elements (e.g., UI elements 704a1 and 704a3) that are adjacent to the first graphic element on the display, and (iii) a second one or more graphic elements (e.g., UI element 704a4) that are not adjacent to the first graphic element on the display.

At 1106, an input device is detected as being located proximally to the display and over the first graphic element of the plurality of graphic elements displayed on the display, e.g., as discussed with respect to FIGS. 7A-7C. At 1108, in response to detecting (i) the input device being located proximally to the display and (ii) over the first graphic element, the first graphic element is displayed with a second size and the second one or more graphic elements are displayed with a third size, wherein the second size is different from each of the first and third sizes. In an example, the second size may be larger than the first and third sizes, and the third size may be smaller than the first size.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A device comprising:
a processor;
memory coupled to the processor;
a display configured to present digital content;
a touch sensor coupled to the processor, the touch sensor configured to detect an input device contacting the display;
a proximity sensor coupled to the processor, the proximity sensor configured to detect proximity and location of the input device with respect to the display and to estimate a distance between the input device and the display; and a user interface (UI) module stored in the memory and executable by the processor to:

present content in a first area on the display of the device, the content comprising a portion of an e-book, an article, or a document;

in response to the proximity sensor detecting a first proximity and a first location of the input device with respect to the display, determine a plurality of menu options to present on the display in textual format based at least in part on the first location of the display to which the first proximity of the input device is directed;

present the plurality of menu options on the display, the plurality of menu options being presented as a first size within a second area of the display;

in response to the proximity sensor determining the input device is at a second proximity with respect to the display, modifying the plurality of menu options from the textual format to a graphical icon format, the second proximity being closer to the display than the first proximity;

in response to the proximity sensor detecting the input device is at a third proximity with respect to the display and at a second location located-over a first menu option of the plurality of menu options, enlarge the first menu option to a first enlarged size and one or more menu options adjacent to the first menu option to a second enlarged size, the second enlarged size being smaller than the first enlarged size, the enlarged first menu option being presented within a third area of the display of the device; and in response to enlarging the first menu option, relocate presentation of the content from the first area to a different area outside of the third area of the display of the device.

2. The device of claim 1, wherein the first enlarged size is based at least in part on the distance between the input device and the display.

3. The device of claim 1, wherein the first enlarged size is altered substantially continuously as the distance between the input device and the display changes, wherein the first enlarged size is inversely proportional to the distance between the input device and the display.

4. The device of claim 1, wherein the second enlarged size is based at least in part on the distance between the input device and the display.

5. The device of claim 1, wherein a first difference between the first size and the first enlarged size, and a second difference between the first size and the second enlarged size are based at least in part on the distance between the input device and the display.

6. The device of claim 1, further comprising:
determining, by the proximity sensor, that the input device is at a fourth proximity with respect to the display;
enlarging the first menu option to a third enlarged size that is greater than the first enlarged size, wherein a difference between the first size and the third enlarged size is based at least in part on the fourth proximity of the input device with respect to the display.

7. The device of claim 1, wherein the proximity sensor is further configured to detect a type of the input device, and wherein enlarging the first menu option is based at least in part on the type of the input device.

8. The device of claim 7, wherein the first enlarged size is set to a first value when the proximity sensor detects the input device to be a stylus, wherein the first enlarged size is set to a second value when the proximity sensor detects the input device to be a body part of a user, and wherein the second value is different than the first value.

9. The device of claim 1, wherein the UI module is further executable by the processor to:
cause performance of an action associated with the first menu option in response to the touch sensor detecting the input device contacting the first menu option on the display.

10. The device of claim 1, wherein the input device is one of a hand or fingertip of a user or a stylus.

11. A computer-implemented method comprising:
presenting content in a first area of a display of a device, the content comprising a portion of an e-book, an article, or a document;
in response to detecting that an input device is at a first proximity to the display of the device and directed to a sub-portion of the display, presenting on the display a plurality of user interface (UI) elements corresponding to a plurality of menu options, the plurality of menu options being presented in textual format at a first size within a second area of the display;
sensing a second proximity of the input device to the display of the device and directed to a UI element of the plurality of UI elements;
in response to sensing the second proximity of the input device with respect to the display, changing the plurality of menu options from the textual format to a graphical icon format on the display of the device, the second proximity being closer to the display than the first proximity;
in response to sensing a third proximity of the input device with respect to the display and at a location corresponding to a first menu option of the plurality of menu options, enlarging the first menu option to a first enlarged size and one or more menu options adjacent to the first menu option to a second enlarged size, the second enlarged size being smaller than the first enlarged size, the enlarged first menu option being presented within a third area of the display; and
in response to enlarging the first menu option, relocating presentation of the content from the first area to a different area outside of the third area of the display.

12. The method of claim 11, further comprising:
estimating a distance between the input device and the display of the device,
wherein a size of a graphical icon corresponding to the first menu option is based at least in part on the estimated distance between the input device and the display of the device.

13. The method of claim 11, further comprising:
detecting a type of the input device,
wherein a size of a graphical icon corresponding to the first menu option is based at least in part on the detected type of the input device.

14. The method of claim 11, further comprising:
detecting that the input device has touched the UI element displayed on the display; and
in response to detecting that the input device has touched the UI element, causing performance of an action associated with the UI element.

15. A computer-implemented method comprising:
- presenting content within a first area of a display of a device, the content comprising a portion of an e-book, an article, or a document;
- detecting that an input device is proximally located to the display of the device and that a proximity of the input device is directed to a sub-portion of the display;
- determining a plurality of menu options to present on the display based at least in part on the sub-portion of the display to which the proximity of the input device is directed;
- in response to detecting that the input device is proximally located at a first proximity to the display of the device and directed to the sub-portion of the display, presenting the plurality of menu options on the display, the plurality of menu options being presented in textual format within a second area of the display;
- in response to detecting the input device being proximally located at a second proximity and over the plurality of menu options, modifying the plurality of menu options from the textual format to a graphical icon format to present at a first size the plurality of menu options as a plurality of graphical icons;
- in response to detecting the input device being proximally located at a third proximity and over a first graphical icon of the plurality of graphical icons, enlarging the first graphical icon to a first enlarged size and one or more graphical icons adjacent to the first graphical icon to a second enlarged size, the second enlarged size being smaller than the first enlarged size, the enlarged first graphical icon being presented within a third area of the display of the device; and
- in response to enlarging the first graphical icon, relocating presentation of the content from the first area to a different area outside of the third area of the display of the device.

16. The method of claim 15, wherein a difference between the first size and the first enlarged size, and a difference between the first size and the second enlarged size are based at least in part on a distance between the input device and the display.

17. The method of claim 15, further comprising:
- detecting a type of the input device,
- wherein the second enlarged size is based at least in part on the type of the input device.

18. The method of claim 15, further comprising:
- estimating a distance between the input device and the display of the device, wherein the first enlarged size and the second enlarged size is based at least in part on the distance;
- detecting a change in the distance between the input device and the display; and
- enlarging the first graphical icon to a third enlarged size that is greater than the first enlarged size, wherein a difference between the first size and the third enlarged size is based at least in part on the change in the distance between the input device and the display.

* * * * *